United States Patent
Alatorre et al.

(10) Patent No.: US 10,620,839 B2
(45) Date of Patent: *Apr. 14, 2020

(54) STORAGE POOL CAPACITY MANAGEMENT

(71) Applicant: International Business Machines Corporation, Armonk, NY (US)

(72) Inventors: Gabriel Alatorre, Long Beach, CA (US); Heiko Hary Ludwig, San Francisco, CA (US); Nagapramod S. Mandagere, San Jose, CA (US); Yang Song, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/213,517

(22) Filed: Dec. 7, 2018

(65) Prior Publication Data

US 2019/0107955 A1 Apr. 11, 2019

Related U.S. Application Data (63) Continuation of application No. 14/675,151, filed on Mar. 31, 2015, now Pat. No. 10,248,319.

(51) Int. Cl.
*G06F 12/00* (2006.01)
*G06F 3/06* (2006.01)

(52) U.S. Cl.
CPC ............ *G06F 3/0608* (2013.01); *G06F 3/067* (2013.01); *G06F 3/0641* (2013.01); *G06F 3/0644* (2013.01); *G06F 3/0685* (2013.01)

(58) Field of Classification Search
CPC .... G06F 3/0608; G06F 3/0673; G06F 3/0653; G06F 3/0631; G06F 3/0644
See application file for complete search history.

(56) References Cited

U.S. PATENT DOCUMENTS

| | | | |
|---|---|---|---|
| 7,702,873 B2 | 4/2010 | Griess et al. | |
| 7,933,936 B2 | 4/2011 | Aggarwal et al. | |
| (Continued) | | | |

FOREIGN PATENT DOCUMENTS

CN 103842972 6/2014

OTHER PUBLICATIONS

Drew, Matt, "Measuring the Performance Effects of Dynamic Compression in IIS 7.0", Web Performance Inc., V1.0, Jan. 9, 2009.

(Continued)

*Primary Examiner* — David Yi
*Assistant Examiner* — Alan Otto
(74) *Attorney, Agent, or Firm* — Lieberman & Brandsdorfer, LLC (57) ABSTRACT

Embodiments relate to a pool of persistent storage volumes. Capacity of the volumes is managed to ensure continued operation and function of the volumes with respect to their corresponding storage pool capacity threshold(s). One or more space savings techniques are selectively performed on a copy of a selected volume. Such techniques include measurement of capacity change and measurement of workload performance change. These measurements are leveraged to produce a subset of space reduction actions for execution. A space reduction action in the form of compression or thinning takes place on-demand on a corresponding volume.

18 Claims, 8 Drawing Sheets

(56) References Cited

U.S. PATENT DOCUMENTS

| | | |
|---|---|---|
| 8,244,868 B2 | 8/2012 | La Frese et al. |
| 8,341,119 B1 | 12/2012 | Roussos et al. |
| 8,407,445 B1 | 3/2013 | Pathak et al. |
| 8,438,362 B2 | 5/2013 | Mukherjee et al. |
| 8,683,171 B2 | 3/2014 | Eguchi |
| 8,751,768 B2 | 6/2014 | Malige et al. |
| 2010/0281079 A1* | 11/2010 | Marwah ............... G06F 16/284 707/812 |
| 2011/0307492 A1 | 12/2011 | Williams et al. |
| 2013/0111160 A1 | 5/2013 | Benhase et al. |
| 2014/0137110 A1 | 5/2014 | Engle et al. |
| 2014/0143517 A1* | 5/2014 | Jin ....................... G06F 3/0608 711/171 |
| 2014/0201492 A1 | 7/2014 | Luan et al. |
| 2015/0370715 A1 | 12/2015 | Samanta et al. |

OTHER PUBLICATIONS

List of IBM Patents or Applications Treated as Related, Dec. 2018.

\* cited by examiner

STORAGE POOL CAPACITY MANAGEMENT

CROSS-REFERENCE TO RELATED APPLICATION

The present application is a continuation patent application claiming the benefit of U.S. patent application Ser. No. 14/675,151, filed on Mar. 31, 2015, and titled "Storage Pool Capacity Management" now pending, the entire contents of which are hereby incorporated by reference.

BACKGROUND

The present invention relates to persistent storage capacity management. More specifically, the invention relates to one or more processes for space savings impact analysis and evaluation and for execution of a space saving technique.

Compression and thin provisioning are techniques used in data centers to reduce storage capacity usage, also known as a storage footprint, thereby making more storage available. Storage administrators can specify whether a storage volume is compressed, thick, or thin, per a management policy not only at initial provisioning time but also during steady state lifecycle. However, reducing storage capacity using any of the above techniques may have a negative impact on application performance. For example, reading from a compressed storage volume requires the volume to be subject to a de-compression technique, which requires additional processing. At the same time, reading from a thinned volume may also require additional processing, such as metadata lookup prior to data access. Reading data from either a compressed volume or a thinned volume introduces I/O latency.

There is a balance between performance of data storage techniques and application of data storage techniques. Performance impacts and capacity savings are functions of a workload and vary widely across different workload types. For example, compressing or thinning a volume has a minimal benefit if there is ample available space in the storage pool in which the application volume resides. As such, storage footprint reducing techniques, such as compression and thin provisioning, are desirable for application to free up storage capacity in storage pools that are near or have surpassed a capacity threshold.

SUMMARY

The invention includes a method, computer program product, and system for management of one or more storage pools containing one or more volumes with respect to availability of storage space.

In one aspect, a method is provided to manage capacity of storage volumes in a storage pool. Live statistics associated with storage pool volumes operating in a first state are maintained. A list of candidate volumes in a storage pool for space reduction is maintained. Characteristics of the list are directed at capacity and performance. The volumes in the list are subject to prioritization as a function of storage growth projection. At such time as a volume from the storage pool is selected, a space saving reduction action on a copy of the selected volumes is performed. This action includes measuring volume capacity change, measuring workload performance change, and producing a subset of optimal space reduction actions for execution. At least one action from the subset is executed on-demand, thereby converting the first state to a second state, wherein the second state is either compressed or thinned.

In another aspect, a computer program product is provided to manage capacity of a storage pool. The computer program product includes a computer readable storage device having embodied program code executable by a processing unit. The program code processes non-compressed data and maintains live statistics associated with storage pool volumes operating in a first state. A list of candidate volumes in a storage pool for space reduction is maintained. Characteristics of the list are directed at capacity and performance. Program code is provided to subject the volumes in the list to prioritization as a function of storage growth projection. At such time as a volume from the storage pool is selected, the program code performs a space saving reduction action on a copy of the selected volumes. This action includes measuring volume capacity change, measuring workload performance change, and producing a subset of optimal space reduction actions for execution. Program code performs on-demand execution of at least one action from the subset, thereby converting the first state to a second state, wherein the second state is either compressed or thinned.

In yet another aspect, a computer system is provided to manage capacity of a storage pool. The system includes a processing unit operatively coupled to memory, and a storage pool with two or more storage volumes, operatively coupled to the processing unit. A management tool is provided in communication with the processing unit to manage capacity of the storage pool. The tool maintains statistics associated with storage pool volumes operating in a first state, the statistic including capacity and performance. The volumes in the list are subject to prioritization as a function of storage growth projection. At such time as a volume from the storage pool is selected, a space saving reduction action on a copy of the selected volumes is performed. This action includes measuring volume capacity change, measuring workload performance change, and producing a subset of optimal space reduction actions for execution. At least one action from the subset is executed on-demand, thereby converting the first state to a second state, wherein the second state is either compressed or thinned.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

There are two primary components to the management of storage volumes, including identification and reclamation. Identification pertains to estimating space savings and performance impact associated with a storage footprint reduction technique. Reclamation pertains to delaying the action of the storage footprint reduction technique until certain criteria are met. Accordingly, these two aspects, including identification and reclamation, are decoupled until such time as the storage savings has been deemed beneficial or necessary.

As discussed above, a data center is configured with two or more storage pools. One or more applications may execute applications with associated data supported by volumes that reside in one or more of these pools. To create storage space in the associated storage pools, compression and/or thin provisioning, also referred to herein as thinning, techniques may be applied on one or more volumes residing in these pools. Application of compressing or thinning on all possible volumes in these pools can be impractical in large scale systems both with respect to a time requirement and any resulting performance overhead.

Figure 1:
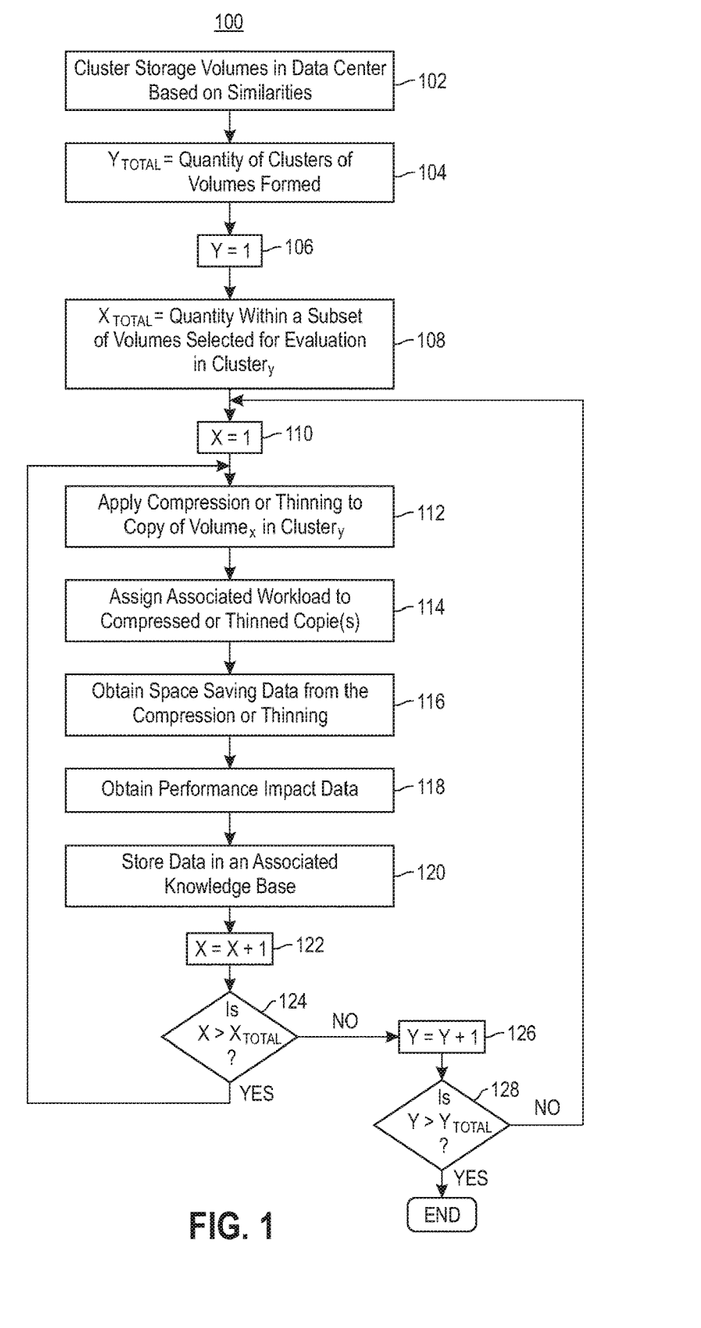
FIG. 1 depicts a flow chart illustrating an overview of the decoupling process.

With reference to FIG. 1, a flow chart (100) is provided illustrating an overview of the decoupling process. A similarity based sampling approach is employed to mitigate time and performance overhead associated with application of thinning and compression on all possible volumes. As such, the storage volumes in the data center are clustered based on similarity (102). In one embodiment, volumes may be deemed similar if they map to the same application, since it increases the likelihood that they store similar types of data. In one embodiment, volumes may be deemed similar if they exhibit similar random or sequential read and write I/O proportions or properties. For example, two volumes with predominantly random write I/O may be seen as similar. In one embodiment, the Pearson correlation coefficient between the I/O proportions of two or more volumes may be employed as a similarity value. Accordingly, using correlation values, volumes can be grouped in a desired number of clusters.

By clustering the volumes, as described above, a subset of volumes in each cluster may be selected for evaluation of compression and thinning. Space savings and performance impact values obtained from the selected volumes in each cluster may be used to estimate similar characteristics for the remaining volumes in the cluster, and in one embodiment may function as guidance for future sampling. The variable $Y_{Total}$ is assigning to the quantity of clusters of volumes formed (104), and an associated cluster counting variable, Y, is initialized (106). For each cluster, a minimum of one volume is employed for evaluation. The variable $X_{Total}$ is assigned to the quantity within a subset of volumes selected for evaluation in $cluster_Y$ (108), and an associated volume counting variable, X, is initialized (110). Compression or thinning is applied to a copy of $volume_X$ in $cluster_Y$ (112) and an associated workload is assigned to the compressed or thinned copie(s) (114). To understand the implications of processing with data that has been compressed or thinned, both space saving data from the compression or thinning is obtained (116) and performance impact data associated with the switch from a non-space reducing state to a space reducing state, such as compressed or thinned copy, is obtained (118). Data obtained at steps (116) and (118) are stored in an associated knowledge base (120). In one embodiment, the knowledge base may be local to the data center in a volume that is not subject to thinning or compression, or the knowledge base may be external to the data center. In one embodiment, capacity data associated with the space saving data is stored at a first location and the performance impact data is stored at a second location. The first and second location may be the same locations or different locations. Accordingly, both space saving data and performance data associated with the compressed or thinned volume is acquired.

Following step (120), the volume counting variable is incremented (122), followed by determining if there are any other volumes in the cluster that are designated for evaluation (124). As described above, a minimum of one copy of a volume in each cluster is thinned or compressed and associated performance and space saving data is acquired to ascertain the implications of compression or thinning for the cluster. In other words, the thinned or compressed copy is representative of the cluster. If at step (124) it is determined that there is volume(s) in the same cluster, $cluster_Y$, designated for evaluation, then the process returns to step (112). However, if at step (124) it is determined that all of the volumes in the cluster subject to or designated for evaluation have been processed, then the cluster counting variable is incremented (126). As described above, the volumes are separated into clusters, with a minimum of one cluster. Following step (126), it is determined if all of the clusters, and specifically, all of the volumes designated for evaluation in each of the clusters, have been processed (128). A negative response to the determination at step (128) is followed by a return to step (110) for processing of any designated volumes in the next cluster. However, a positive response to the determination at step (128) concludes the processing of volumes.

The process of evaluating storage volumes is repeated periodically for various reasons, including but not limited to, changes in workload, changes in the data center, etc. Similarly, in one embodiment, the process shown and described in FIG. 1 functions as a background process that is repeated on a periodic basis so that the data in the knowledge base is current. In one embodiment, the process shown and described in FIG. 1 may be activated by an administrator in the event that current data for the knowledge base is required or desired. Accordingly, the process shown and described in FIG. 1 provides performance impact data and space saving data representative of the volumes.

The process shown and described in FIG. 1 may be referred to as a background process. The evaluation is performed on copies of the selected volumes, and does not affect performance on the volume itself. In one embodiment, the data continues to be processed on the non-compressed or non-thinned volumes, while the background process performs the same application execution on the compressed or thinned copies as a sampling technique. The space saving and performance impact data that takes place in the background is acquired so that in the event a space saving technique is required, an educated decision may determine which volumes and/or clusters may be compressed or thinned with minimum impact on performance.

Figure 2:
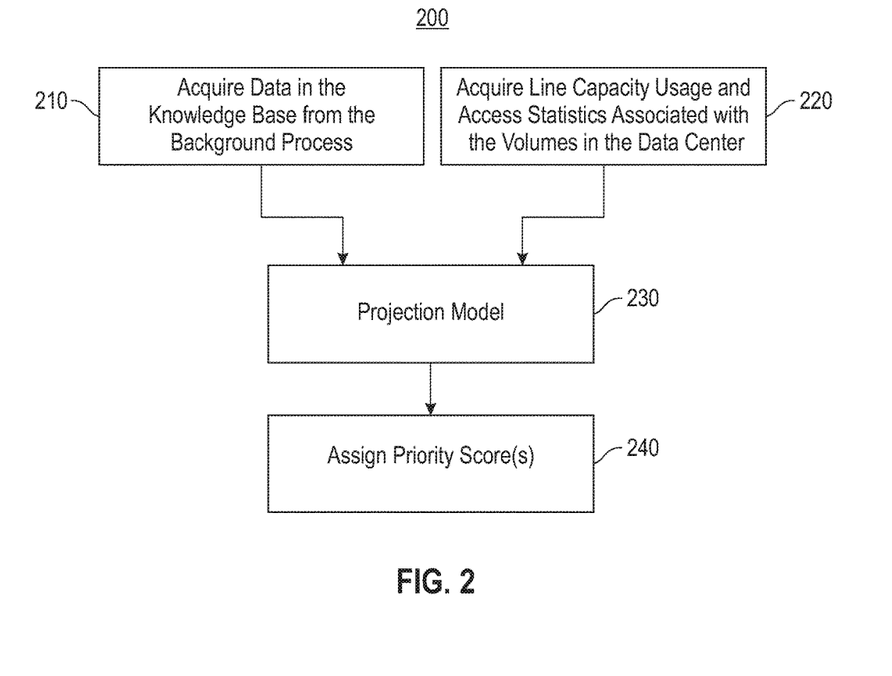
FIG. 2 depicts a flow chart illustrating a process for estimating space savings.

Referring to FIG. 2, a flow chart (200) is provided illustrating a process for estimating space savings. At any given point-in-time, space savings from compression or thinning a volume copy can be estimated using temporal measurements stored in the knowledge base. Data stored in the volumes of a data center is dynamic in that data continues to be read or written to the subject volumes as applications are processed. As shown and described in FIG. 1, data in the knowledge base is acquired from the background process (210). At the same time, there is live capacity usage and access statistics associated with the volumes in the data center (220). The live data pertains to changes associated with the storage volumes since a prior population of the knowledge base from the background process. Such live data includes, but is not limited to, a quantity of read and write requests, a quantity of data delete requests, etc. In one embodiment, one or more counters are employed to track the live usage data between executions of the background process. Data from the knowledge base at step (210) and from the live statistics at step (220) are received as input to a projection model (230). More specifically, the input data are employed by the projection model to ascertain how much data in one or more volumes of the data center has been subject to change since the prior estimate. In one embodiment, a linear regression model is employed to estimate growth projection at step (230). In one embodiment, I/O access patterns, experienced by one or more volumes between measurements found in the knowledge base and current time, are used to predict a change in space savings since the last measurement. Following the projection at step (230), a priority score is assigned to each volume in the data center subject to evaluation (240). In one embodiment, the volumes may be sorted based on the associated priority scores, which may then be used to efficiently identify one or more volumes for compression or thinning. Accordingly, the estimation process shown herein employs static and dynamic storage data to categorize one or more volumes for a potential space saving technique.

Figure 3:
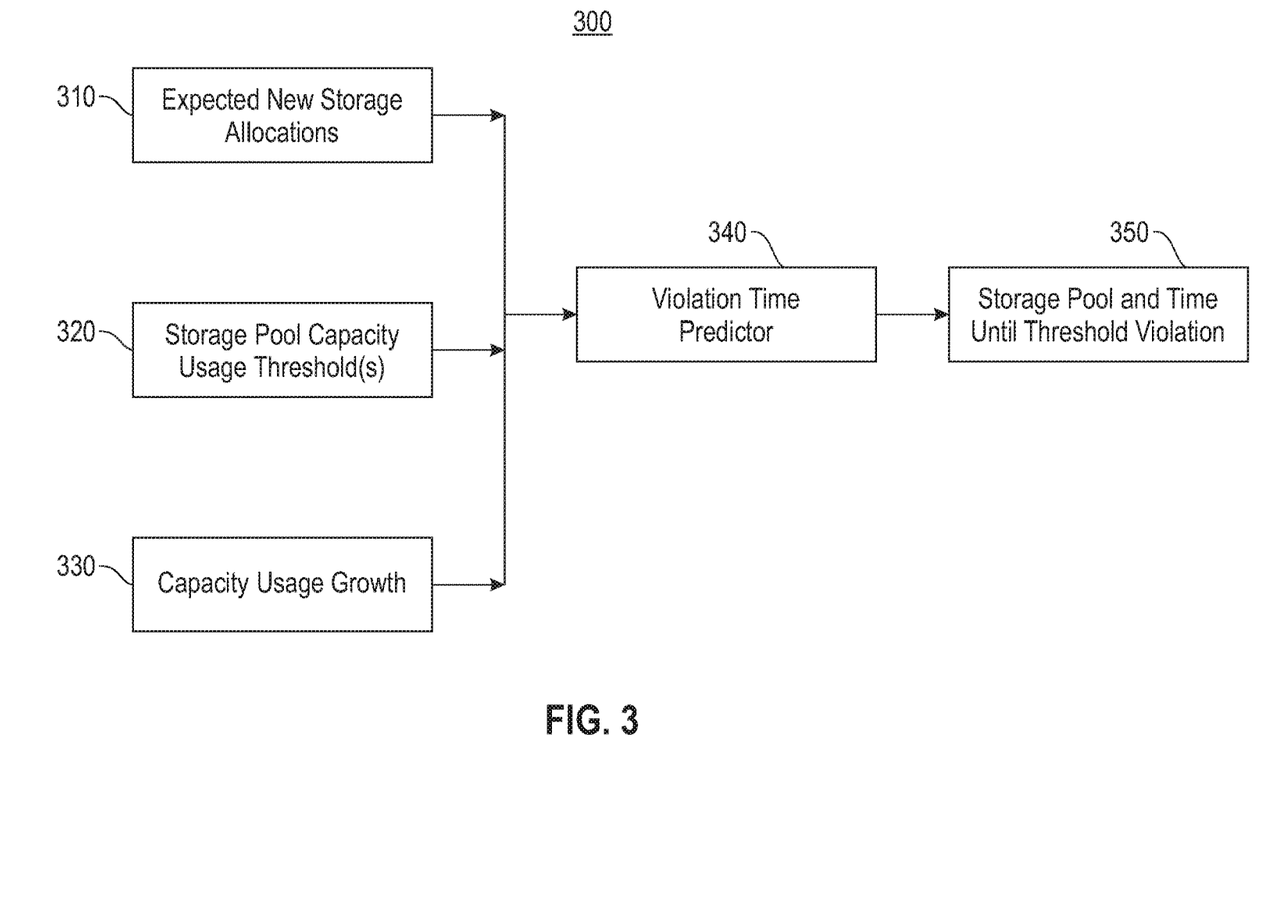
FIG. 3 depicts a flow chart illustrating a process for predicting a storage threshold violation.

It is important to ensure that pools do not exceed their capacity. In one embodiment, a storage threshold is set to a value lower than the actual capacity to ensure that capacity is not exceeded. For example, in one embodiment, a space savings technique, such as compression or thinning takes place when the associated storage pool is operating at 80% capacity. Referring to FIG. 3, a flow chart (300) is provided illustrating a process for predicting a storage threshold violation. As shown, input for the violation prediction comes in at least three forms of data, including but not limited to, expected new storage allocations (310), storage pool capacity usage threshold(s) (320), and capacity usage growth (330). In one embodiment, the expected allocations at step (310) are provided by an administrator or it is predicted based on allocation history. In one embodiment, the capacity at step (320) is a fixed value based on the size of the associated storage volume(s), although in one embodiment, this value may be subject to change based on data transfer and/or compression or thinning. In one embodiment, the capacity usage growth (330) pertains to fluctuations in the range of storage pool usage. For example, if a volume has been added or removed from the pool. Data from (310), (320), and (330) are received as input for predicting a time for violation of the storage pool capacity (340). Output (350) from the prediction step (340) is generated in the form of storage pool and time until threshold violation. More specifically, the violation prediction at step (340) provides output data (350) in the form of a time estimate at which the capacity will be exceeded. In one embodiment, the time estimate may be on a per volume basis, a cluster of volumes basis, or a storage pool basis. Accordingly, the process shown and described herein is employed to predict a time threshold violation based on a plurality of factors, including accommodating for fluctuations in usage.

Figure 4:
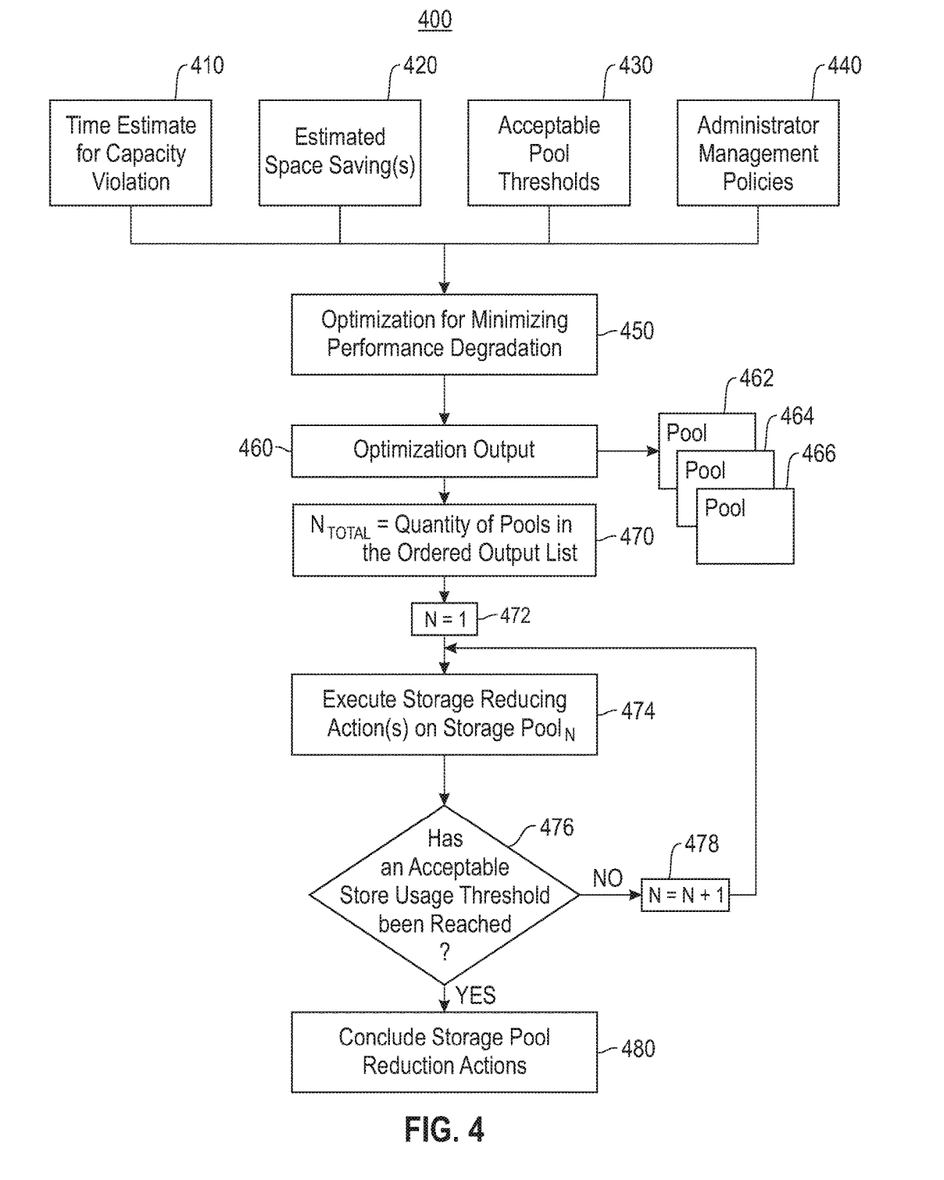
FIG. 4 depicts a flow chart illustrating managing storage capacity.

One of the goals of creation, maintenance, and utilization of the knowledge base is to predict and ensure that storage volume thresholds are not violated. Referring to FIG. 4, a flow chart (400) is provided illustrating managing storage capacity. Four elements are employed as input data for minimizing performance degradation associated with storage volume management, also referred to as optimization. Input for the optimization includes, the time estimate for capacity violation (410), as shown and described in FIG. 3, the estimated space saving(s) (420), as shown and described in FIG. 2, acceptable pool thresholds (430), and administrator management policies (440). The pool thresholds (430) may be static values, or in one embodiment, a dynamic value. In one embodiment, the policies at step (440) pertain to guidance on compression or thinning, as each of these forms of space savings are different and may have variances on impact. In one embodiment, the space savings at step (420) may be different depending on the technique employed. Data from steps (410)-(440) are subject to optimization (450) for minimizing performance degradation. Output from the optimization (460) includes a prioritized list of all storage footprint reducing actions that can be taken for each storage pool. As shown herein, three storage pools (462), (464), and (466) are shown sorted based on prioritization for footprint reduction. In one embodiment, each storage pool's volume has an action list that is sorted based on priority. For example, the sorting may be based on the product of volume space savings and I/O latency increase. In one embodiment, the sorting is conducted in an order that executes one or more actions that generate savings from the greatest quantity of savings to the least quantity of savings. In one embodiment, the sorting of the action list brings efficiency into the volume selection process, wherein the list exhibits a prioritization of the volumes. Accordingly, output from the optimization orders the storage pools under investigation.

As shown, the optimization at step (460) filters actions based on feasibility of completion, which in one embodiment uses a model for a projected completion time for space reductions. Specifically, if the space reduction cannot take place in the time required, there may be a space violation. Projection of the completion time may affect the sorting of the list of storage pools (462), (464), and (466). In one embodiment, the quantity of storage pools in the list may vary, and as such, the quantity shown and described herein is merely an example and should not be considered limiting. Following output from the optimization at step (460), one or more volume storage reducing actions are executed for each designated storage pool. More specifically, the variable $N_{Total}$ is assigned to the quantity of storage pools in the ordered output list (470), and an associated storage pool counting variable, N, is initialized (472). The storage reducing action(s) is executed on storage $pool_N$ (474). It is then determined if an acceptable storage pool usage threshold is reached so that no further action is required at this point-in-time (476). A negative response to the determination at step (476) is followed by incremented the storage pool counting variable (478) and a return to step (474). However, a positive response to the determination at step (476) concludes the storage pool reduction actions (480). In one embodiment, storage reduction actions for the pool with the smallest time to threshold violation are executed first, followed by the next smallest time to threshold violation, etc. Accordingly, the footprint of available storage space is managed in a methodical manner to effectively and efficiently enable continued storage of data with minimal impact on storage performance.

The processes shown and described in FIGS. 1-4 illustrate decoupling estimation and identification of storage footprint reduction and actual reclamation of storage space. This decoupling introduces a model based approach to address the dynamic characteristics of data storage. More specifically, capacity savings are attained in persistent storage medium through capacity reducing optimizations, such as thinning and compression.

Figure 5:
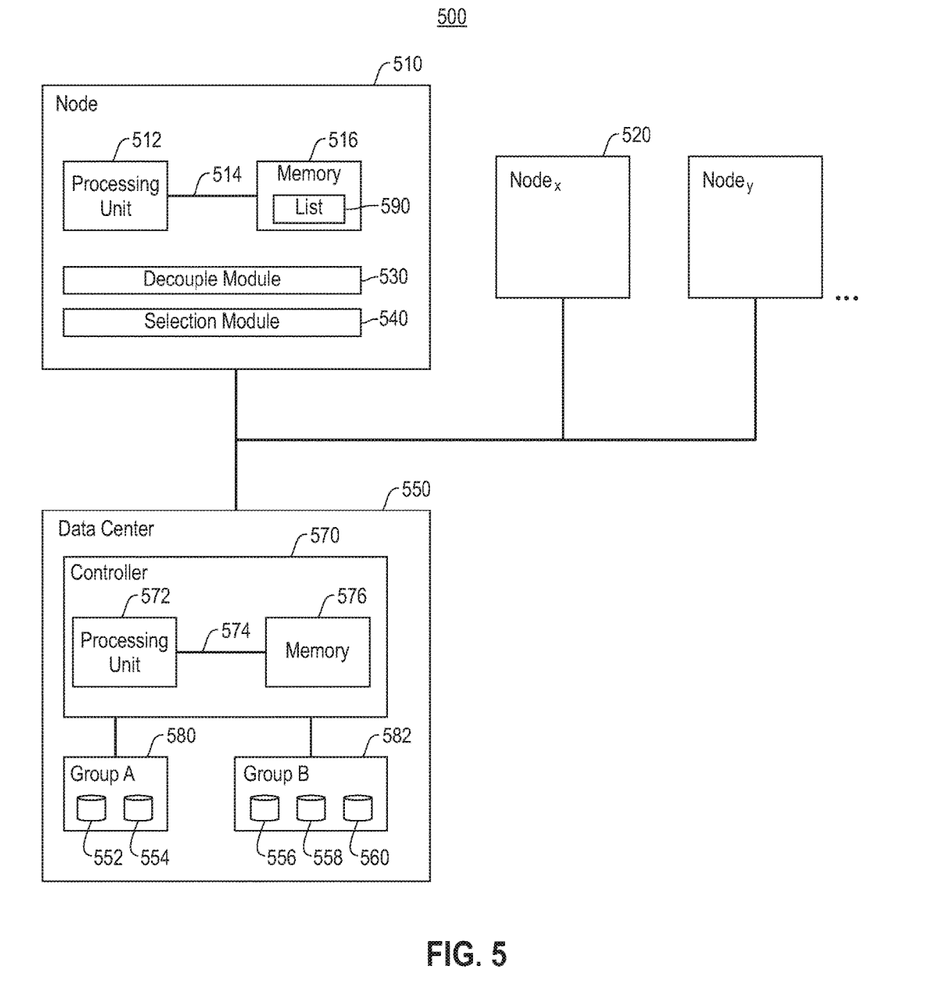
FIG. 5 depicts a block diagram illustrating components of a storage pool capacity management system.

Referring to FIG. 5, a block diagram (500) is provided illustrating components of a storage pool capacity management system. As shown, a processing node (510) is shown in communication with a data center (550). The processing node (510) is provided with a processor (512), also referred to herein as a processing unit, operatively coupled to memory (516) across a bus (514). The processing node (510) is further provided in communication with other nodes (520), which are each in communication with persistent storage maintained in the data center (550). Processing node (510) is responsible for the storage and maintenance of data in the data center (550). More specifically, node (510) is provided with one or more tools to support storage pool capacity management based on de-coupling capacity estimation from capacity saving execution. As shown herein, and described in detail below, the tools embody an adaptive system comprised of two modules, including a decouple module (530) and a selection module (540). The decouple module (530) functions to estimate capacity savings from one or more space reduction actions. The selection module (540) functions to dynamically select and execute a subset of the space reduction actions based on predicted threshold violations.

As shown, the data center (550) is configured with a plurality of persistent storage volumes (552), (554), (556), (558), and (560). Although only five volumes are shown and described, this quantity should not be considered limiting. In one embodiment, the data center (550) includes a controller (570) to facilitate management of the storage volumes. As shown, the storage controller (570) is shown with a processor (572) operatively coupled to memory (576) via a bus (574). The controller (570) is in communication with the modules (530) and (540). More specifically, management control is communicated to the controller via the modules to facilitate execution of any management actions on the storage volumes.

The decouple module (530) functions to separate the estimation of capacity savings associated with one or more space reduction actions from actual execution of these actions. In the separation process, the decouple module (530) employs a similarity based sampling approach so that volumes in the data center (550) may be placed into groups, also referred to as clusters based on similarity, such as volumes that map to the same application, exhibit similar random and sequential read and write I/O proportions, etc. For example, as shown herein, volumes (552) and (554) are placed in a first group, $group_A$ (580), and volumes (556), (558), and (560) are placed in a second group, $group_B$ (582). Although only two groups are shown, this quantity is an example and should not be considered limiting. At the same time, the grouping of volumes is not static, and is subject to change. Data obtained from analysis of one or more volumes in a cluster may be extrapolated to other volumes in the cluster, but upon the similarity protocol. Accordingly, analysis may be limited to a subset of volumes in any given cluster.

As shown in FIG. 5, one or more volumes in a cluster are selected for analysis associated with capacity management. The decouple module (530) is responsible for capacity management, and more specifically, for performing a space reduction action on at least one selected volume in a cluster and a study associated with effects on the storage system and storage performance associated with the space reduction. More specifically, the decouple module measures capacity savings associated with the space reduction, switches an associated workload to a copy of the reduced volume, measures performance from the switched workload, records any performance degradation, and then removes the reduction so that the system may revert back to a prior state. Data gathered and associated from the decouple module (530) enables predictions associated with storage capacity management to be made and executed with careful consideration. The predictions may be converted to actions to ensure available capacity for data storage. Based upon the similarity between various clusters of volumes, the decouple module (530) may infer capacity savings and performance degradation for a cluster or volume in the clusters based on measurements acquired from the volume in the cluster that was subject to thinning or compression.

Storage capacity threshold is an important factor that is managed so that there is sufficient storage space to manage data processing. In one embodiment, the threshold relates to a percentage of space remaining in a storage volume. Any time a volume is compressed or thinned there will be a negative effect on performance. The goal is to compress or thin one or more volumes when required. As such, there is a balancing act that is performed between the decouple module (530) and the selection module (540), with the decouple module (530) running in the background and the selection module (540) running in the foreground. The selection module (540) selects one or more volumes from the storage pool for compression or thinning based on a predicted capacity threshold violation. In one embodiment, the decouple module (530) creates and maintains a list (590) of candidate volumes in each pool for space reduction. The list (590) corresponds to capacity savings and performance measurements. In one embodiment, the list (590) is sorted and a priority is assigned to select volumes in the list (590). The selection of storage volumes and execution by the selection module (540) takes place on-demand. In one embodiment, the selection module (540) conducts their selection based on the sorted list (590). The list (590) is shown embedded in memory (516), although in one embodiment, the list (590) may be stored local to the data center (550) of local to the controller (570).

The volumes in the storage pool may be a static quantity. Although in one embodiment, volumes may be added or removed from the storage pool. Communication with the volumes is ongoing. One or more processing nodes communicate with the storage pool to support application processing that requires read and/or write operations to one or more storage volumes. The flow of communications between the processing node(s) and the storage pool is referred to as I/O. In one embodiment, an I/O pattern may be visualized between the processing node(s) and associated storage volumes. The decouple module (530) may utilize the I/O pattern to predict a change in space savings and usage since a prior measurement of a volume in the cluster. More specifically, the decouple module (530) may update the measurements, thereby creating measured data associated with the volumes after the estimation, with the measured data associated with the update based on the I/O pattern. In one embodiment, the update of the measurements includes an invalidation of any prior measurements. Accordingly, measurement data from sampling volumes and assessing storage capacity may be updated based upon actual access patterns for the volumes.

The system described in FIG. 5 has been labeled with tools in the form of modules (530) and (540). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments. One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects of the embodiment(s).

The tools shown and described herein support management of storage volume capacity in a pool of multiple storage volumes, and adaptively selecting one or more volumes for space reductions based on a predicted threshold violation. As described above, the ramifications associated with space reduction is performed as a background operation so that the volumes and associated clusters may be ranked and sorted, and the selection of a volume for space reduction is based on the ranking and sorting. In one embodiment, the ranking and sorting is on a per volume basis, and in one embodiment it is expanded to include ranking and sorting the clusters in which the volumes are organized. Similarly, in one embodiment, the functionality and support of the capacity management and selection of volumes for space reduction in support of the management may be extrapolated to a cloud computing environment with a shared pool of resources.

Figure 6:
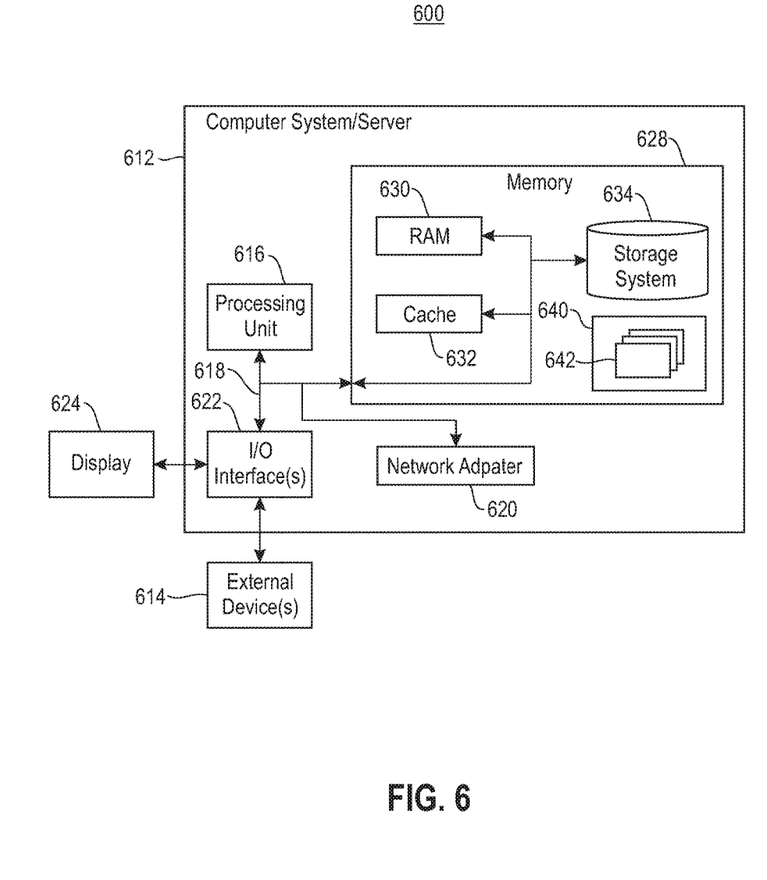
FIG. 6 depicts an example of a cloud computing node.

A cloud computing environment is service oriented with a focus on statelessness, low coupling, modularity, and semantic interoperability. At the heart of cloud computing is an infrastructure comprising a network of interconnected nodes. Referring now to FIG. 6, a schematic of an example of a cloud computing node is shown. Cloud computing node (610) is only one example of a suitable cloud computing node and is not intended to suggest any limitation as to the scope of use or functionality of embodiments described herein. Regardless, cloud computing node (610) is capable of being implemented and/or performing any of the functionality set forth hereinabove. In cloud computing node (610) there is a computer system/server (612), which is operational with numerous other general purpose or special purpose computing system environments or configurations. Examples of well-known computing systems, environments, and/or configurations that may be suitable for use with computer system/server (612) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (612) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (612) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server (612) in cloud computing node (610) is shown in the form of a general-purpose computing device. The components of computer system/server (612) may include, but are not limited to, one or more processors or processing units (616), system memory (628), and a bus (618) that couples various system components including system memory (628) to processor (616). Bus (618) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (612) typically includes a variety of computer system readable media. Such media may be any available media that is accessible by a computer system/server (612), and it includes both volatile and non-volatile media, and removable and non-removable media.

System memory (628) can include computer system readable media in the form of volatile memory, such as random access memory (RAM) (630) and/or cache memory (632). Computer system/server (612) may further include other removable/non-removable, volatile/non-volatile computer system storage media. By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (618) by one or more data media interfaces. As will be further depicted and described below, memory (628) may include at least one program product having a set (e.g., at least one) of program modules that are configured to carry out the functions of the embodiment(s).

Program/utility (640), having a set (at least one) of program modules (642), may be stored in memory (628) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments as described herein.

Computer system/server (612) may also communicate with one or more external devices (614), such as a keyboard, a pointing device, a display (624), etc.; one or more devices that enable a user to interact with computer system/server (612); and/or any devices (e.g., network card, modem, etc.) that enables computer system/server (612) to communicate with one or more other computing devices. Such communication can occur via Input/Output (I/O) interfaces (622). Still yet, computer system/server (612) can communicate with one or more networks such as a local area network (LAN), a general wide area network (WAN), and/or a public network (e.g., the Internet) via network adapter (620). As depicted, network adapter (620) communicates with the other components of computer system/server (612) via bus (618). It should be understood that although not shown, other hardware and/or software components could be used in conjunction with computer system/server (612). Examples, include, but are not limited to: microcode, device drivers, redundant processing units, external disk drive arrays, RAID systems, tape drives, and data archival storage systems, etc.

Figure 7:
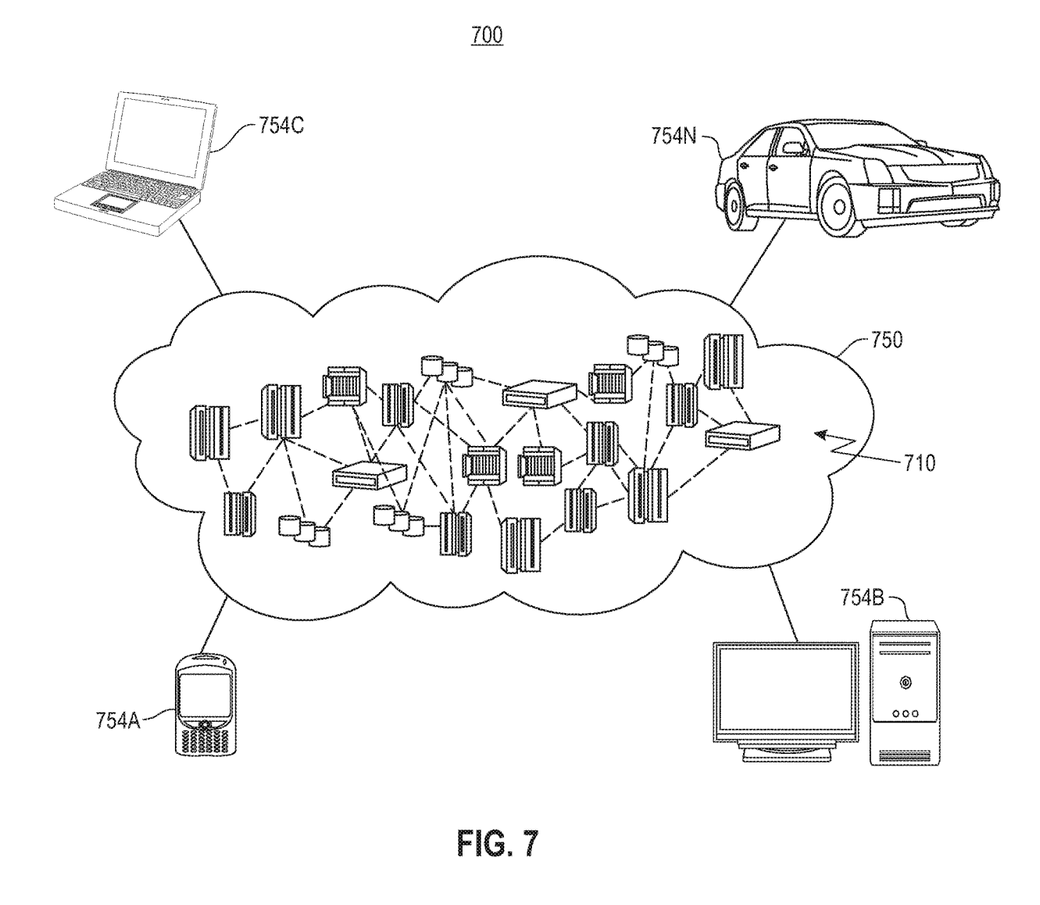
FIG. 7 depicts a cloud computing environment.

Referring now to FIG. 7, illustrative cloud computing environment (750) is depicted. As shown, cloud computing environment (750) comprises one or more cloud computing nodes (710) with which local computing devices used by cloud consumers, such as, for example, personal digital assistant (PDA) or cellular telephone (754A), desktop computer (754B), laptop computer (754C), and/or automobile computer system (754N) may communicate. Nodes (710) may communicate with one another. They may be grouped (not shown) physically or virtually, in one or more networks, such as Private, Community, Public, or Hybrid clouds as described hereinabove, or a combination thereof. This allows cloud computing environment (750) to offer infrastructure, platforms, and/or software as services for which a cloud consumer does not need to maintain resources on a local computing device. It is understood that the types of computing devices (754A)-(754N) shown in FIG. 7 are intended to be illustrative only and that computing nodes (710) and cloud computing environment (750) can communicate with any type of computerized device over any type of network and/or network addressable connection (e.g., using a web browser).

Figure 8:
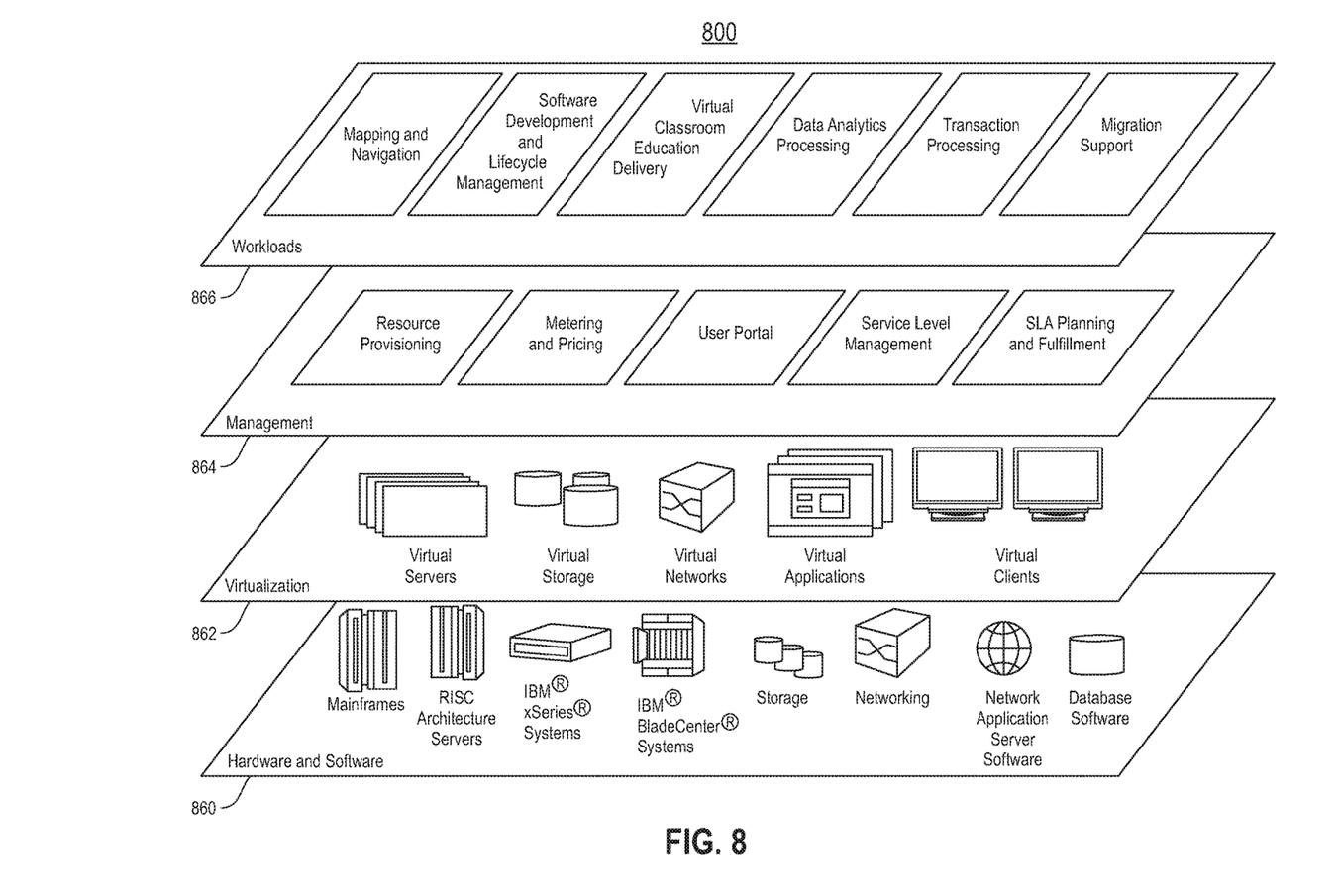
FIG. 8 depicts a set of functional abstraction layers provided by the cloud computing environment.

Referring now to FIG. 8, a set of functional abstraction layers provided by cloud computing environment (800) is shown. It should be understood in advance that the components, layers, and functions shown in FIG. 8 are intended to be illustrative only and embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients. In one example, a management layer (830) may provide the following functions: resource provisioning, metering and pricing, user portal, service level management, and key management. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators.

Workloads layer (840) provides examples of functionality for which the cloud computing environment may be utilized. In the shared pool of configurable computer resources described herein, hereinafter referred to as a cloud computing environment, files may be shared among users within multiple data centers, also referred to herein as data sites. Accordingly, a series of mechanisms are provided within the shared pool to support organization and management of data storage within the cloud computing environment.

The processes shown and described herein address components that function to manage storage pool capacity. Specifically, there is the background process to obtain accurate estimates by actually compressing or thinning at least one volume per pool and acquiring data associated with transactions on the compressed or thinning volume(s). The acquired data is then employed to estimate behavior of other volumes in the same pool. The foreground process employs the background data to address capacity saving execution. The background and foreground processes decouple estimation from actual reclamation.

The present invention as shown and described in details in the figures may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of the background process enables the storage volumes to continue supporting applications, while capacity management functions to ensure availability of sufficient storage space.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

What is claimed is:

1. A computer implemented method for managing capacity of a storage pool comprising:
   processing non-compressed data and maintaining live usage statistics associated with volumes in the storage pool operating at a first state;
   maintaining a list of candidate volumes in each storage pool for space reduction, the list associated with corresponding capacity savings and performance measurements;
   prioritizing volumes for each storage pool in the list as a function of storage growth projection;
   selecting a volume from the storage pool, and performing a first space reduction action on a copy of the selected volume, including:
      measuring a capacity change associated with the selected volume;
      measuring performance change from a workload on the selected volume; and
      producing a subset of optimal space reduction actions for execution, the actions based on the recorded capacity and performance change data; and
   on-demand, executing at least one action from the produced subset of optimal space reduction actions on a corresponding volume in the storage pool in the first state, the execution selectively converting one or more non-compressed volumes in the storage pool to a second state, wherein the second state is selected from the group consisting of: compressed and thinned.

2. The method of claim 1, further comprising periodically evaluating storage volume and storage performance measurements as a background process.

3. The method of claim 1, further comprising predicting a storage threshold violation, including storage pool and time until threshold violation.

4. The method of claim 3, wherein the storage threshold violation prediction includes a time estimate of storage pool capacity, and wherein the estimate is on a basis selected from the group consisting of volume, cluster of volumes, and storage pool.

5. The method of claim 1, further comprising inferring capacity saving and performance degradation for a non-selected volume in the pool, wherein the inference is based on the measurements from the selected volume.

6. The method of claim 1, further comprising predicting a change in space saving since a prior measurement, the prediction employing an I/O access pattern observed for each volume.

7. A computer program product for managing capacity of a storage pool, the computer program product comprising a computer readable storage device having program code embodied therewith, the program code executable by a processing unit to:
   process non-compressed data and maintaining live usage statistics associated with volumes in the storage pool operating at a first state;
   maintain a list of candidate volumes in each storage pool for space reduction, the list associated with corresponding capacity savings and performance measurements;
   prioritize volumes for each storage pool in the list as a function of storage growth projection;
   select a volume from the storage pool and perform a first space reduction action on a copy of the selected volume, including:
      measure a capacity change associated with the selected volume, and record capacity change data in a first location;
      measure performance change from a switched workload on the selected volume, and record performance change data in a second location; and
      produce a subset of optimal space reduction actions for execution, the actions based on the recorded capacity and performance change data; and
   on-demand, execute at least one action from the produced subset of optimal space reduction actions on a corresponding volume in the storage pool in the first state, the execution to selectively convert one or more non-compressed volumes in the storage pool to a second state, wherein the second state is selected from the group consisting of: compressed and thinned.

8. The computer program product of claim 7, further comprising program code to periodically evaluate storage volume and storage performance measurements as a background process.

9. The computer program product of claim 7, further comprising program code to predict a storage threshold violation, including storage pool and time until threshold violation.

10. The computer program product of claim 9, wherein the storage threshold violation prediction includes a time estimate of storage pool capacity, and wherein the estimate is on a basis selected from the group consisting of volume, cluster of volumes, and storage pool.

11. The computer program code of claim 7, further comprising program code to infer capacity saving and performance degradation for a non-selected volume in the pool, wherein the inference is based on the measurements from the selected volume.

12. The computer program code of claim 7, further comprising program code to:
- predict a change in space saving since a prior measurement, the prediction employing an I/O access pattern observed for each volume; and
- periodically update the measurements, including invalidating any prior measurement data.

13. A computer system comprising:
- a processing unit operatively coupled to memory;
- a storage pool, having two or more storage volumes, operatively coupled to the processing unit, wherein non-compressed data is processed and live usage statistics associated with the volumes in the storage pool operating at a first state is maintained;
- a tool in communication with the processing unit to manage capacity of the storage pool, including the tool to:
  - maintain a list of candidate volumes in each storage pool for space reduction, the list associated with corresponding capacity savings and performance measurements;
  - prioritize volumes for each storage pool in the list as a function of storage growth projection;
  - select a volume from the storage pool, and perform a first space reduction action on a copy of the selected volume, including:
    - measure a capacity change associated with the selected volume, and record capacity change data in a first location;
    - measure performance change from a workload on the selected volume, and record performance change data in a second location; and
    - produce a subset of optimal space reduction actions for execution, the actions based on the recorded capacity and performance change data; and
- a selection module to on-demand, execute at least one action on the produced subset of optimal space reduction actions on a corresponding volume in the storage pool in the first state, the execution selectively converting one or more non-compressed volumes in the storage pool to a second state, wherein the second state is selected from the group consisting of: compressed and thinned.

14. The system of claim 13, further comprising the tool to periodically evaluate storage volume and storage performance measurements as a background process.

15. The system of claim 13, further comprising the tool to predict a storage threshold violation, including storage pool and time until threshold violation.

16. The system of claim 15, wherein the storage threshold violation prediction includes a time estimate of storage pool capacity, and wherein the estimate is on a basis selected from the group consisting of volume, cluster of volumes, and storage pool.

17. The system of claim 13, further comprising the tool to infer capacity saving and performance degradation for a non-selected volume in the pool, wherein the inference is based on the measurements from the selected volume.

18. The system of claim 13, further comprising the tool to:
- predict a change in space saving since a prior measurement, the prediction employing an I/O access pattern observed for each volume; and
- periodically update the measurements, including invalidating any prior measurement data.

\* \* \* \* \*